(12) United States Patent
Nam et al.

(10) Patent No.: US 9,885,906 B2
(45) Date of Patent: Feb. 6, 2018

(54) METHOD OF MANUFACTURING A POLARIZER WITH REDUCED REFLECITIVITY AND A DISPLAY PANEL HAVING THE SAME

(71) Applicant: Samsung Display Co., Ltd., Yongin (KR)

(72) Inventors: Jung-Gun Nam, Suwon-si (KR); Dae-Young Lee, Seoul (KR); Dae-Hwan Jang, Seoul (KR); Gug-Rae Jo, Asan-si (KR); Hyung-Bin Cho, Seongnam-si (KR); Kang-Soo Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/692,352

(22) Filed: Apr. 21, 2015

(65) Prior Publication Data
US 2016/0116798 A1    Apr. 28, 2016

(30) Foreign Application Priority Data

Oct. 22, 2014    (KR) .................. 10-2014-0143413

(51) Int. Cl.
*G02F 1/1335*    (2006.01)
*G02B 5/30*    (2006.01)

(52) U.S. Cl.
CPC ..... *G02F 1/133528* (2013.01); *G02B 5/3058* (2013.01); *G02F 2001/133548* (2013.01)

(58) Field of Classification Search
CPC combination set(s) only.
See application file for complete search history.

(56) References Cited

U.S. PATENT DOCUMENTS

| 6,288,840 | B1 | 9/2001 | Perkins et al. |
| 7,965,357 | B2 | 6/2011 | Van De Witte et al. |
| 8,049,841 | B2 | 11/2011 | Sugita et al. |
| 2011/0079782 | A1* | 4/2011 | Kim ............... G02F 1/133516 257/59 |
| 2013/0016293 | A1* | 1/2013 | Cho ............... G02B 5/201 349/15 |
| 2014/0016059 | A1* | 1/2014 | Lee ............... G02B 5/3058 349/46 |
| 2014/0098330 | A1* | 4/2014 | Nam ............... G02B 5/201 349/96 |
| 2014/0354923 | A1 | 12/2014 | Lee et al. |
| 2015/0062497 | A1 | 3/2015 | Nam et al. |

FOREIGN PATENT DOCUMENTS

| KR | 10-2011-0061899 | 6/2011 |
| KR | 10-2014-0013654 | 2/2014 |
| KR | 10-2014-0046604 | 4/2014 |

* cited by examiner

*Primary Examiner* — Lauren Nguyen
(74) *Attorney, Agent, or Firm* — H.C. Park & Associates, PLC

(57) ABSTRACT

A method of manufacturing a polarizer, the method including: forming a metal layer on a substrate; forming a hard mask on the metal layer; forming an adhesion layer on a portion of the hard mask; forming a polymer layer on the hard mask and the adhesion layer; pressing a mold on the polymer layer to form a lattice pattern in association with the polymer layer; removing the mold and a portion of the lattice pattern; and patterning the adhesion layer, the hard mask, and the metal layer using a remaining portion of the lattice pattern as a mask.

7 Claims, 11 Drawing Sheets

METHOD OF MANUFACTURING A POLARIZER WITH REDUCED REFLECITIVITY AND A DISPLAY PANEL HAVING THE SAME

This application claims priority from and the benefit of Korean Patent Application No. 10-2014-0143413, filed on Oct. 22, 2014, which is hereby incorporated by reference for all purposes as if fully set forth herein.

BACKGROUND

Field

Exemplary embodiments relate to a method of manufacturing a polarizer and a display panel including the polarizer.

Discussion of the Background

A liquid crystal display apparatus applies a voltage to a liquid crystal layer to change a molecular arrangement of the liquid crystal layer. Accordingly, optical properties including a birefringence, an optical rotation, a dichroism, a light scattering may be changed to cause a visional change and display an image. The liquid crystal display apparatus generally includes a polarizer to control light transmittance. The polarizer may transmit a light component parallel to a transmitting axis, and block a light component perpendicular to the transmitting axis. The polarizer absorbs some of light from a light source, and thus, light efficiency of the liquid crystal display apparatus may be decreased. A polarizer may include a wire grid pattern. When the wire grid pattern of the polarizer includes a metal such as aluminum, a reflectivity of the polarizer may be increased, and thus the visibility of the liquid crystal display apparatus may be decreased.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method of manufacturing the polarizer.

Exemplary embodiments provide a display panel including the polarizer.

Additional aspects will be set forth in the detailed description which follows, and, in part, will be apparent from the disclosure, or may be learned by practice of the inventive concept.

According to one or more exemplary embodiments, a method of manufacturing a polarizer includes: forming a metal layer on a substrate; forming a hard mask on the metal layer; forming an adhesion layer on a portion of the hard mask; forming a polymer layer on the hard mask and the adhesion layer; pressing a mold on the polymer layer to form a lattice pattern in association with the polymer layer; removing the mold and a portion of the lattice pattern; and patterning the adhesion layer, the hard mask, and the metal layer using a remaining portion of the lattice pattern as a mask.

According to one or more exemplary embodiments, a method of manufacturing a polarizer includes: forming a metal layer on a substrate; forming a hard mask on the metal layer; forming an adhesion layer on the hard mask; forming a polymer layer on the adhesion layer; pressing a mold on the polymer layer to form a lattice pattern in association with the polymer layer; disposing a light blocking mask over a portion of the mold; radiating light towards the mold and the light blocking mask to expose a first portion of the lattice pattern to the light, the first portion being adjacent to the portion of the mask; removing the mold and a second portion of the lattice pattern; and patterning the adhesion layer, the hard mask, and the metal layer using a remaining portion of the lattice pattern as a mask.

According to one or more exemplary embodiments, a display panel includes a first substrate; a second substrate facing the first substrate, the second substrate including a thin film transistor; and a liquid crystal layer disposed between the first substrate and the second substrate, wherein the first substrate includes: a first polarizer including a first metal pattern spaced apart from a second metal pattern, the first and second metal patterns being disposed in a light transmittance area of the first substrate; and a black matrix disposed outside the light transmittance area of the first substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF ILLUSTRATED EMBODIMENTS

Figure 1:
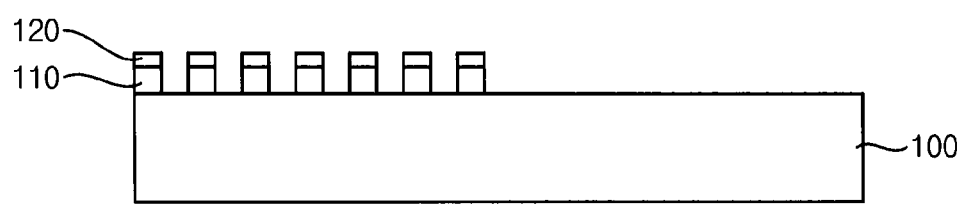
FIG. 1 is a cross-sectional view illustrating a polarizer in accordance with one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to plan and/or sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view illustrating a polarizer in accordance with one or more exemplary embodiments.

Referring to FIG. 1, the polarizer may include a substrate 100, a first metal layer 110 and a second metal layer 120.

The substrate 100 includes material having relatively high transmittance, thermos-stability, and chemical compatibility. For example, the substrate 100 may include, but not limited to, at least one of glass, polyethylenenaphthalate, polyethylene terephthalate, and polyacryl.

The first metal layer 110 is disposed on the substrate 100. The first metal layer 110 may include a plurality of protrusions. The adjacent protrusions are spaced apart from each other. The protrusions may form a linear pattern. The first metal layer 110 may include at least one of aluminum (Al), gold (Au), silver (Ag), copper (Cu), chrome (Cr), iron (Fe), and nickel (Ni). A thickness of the first metal layer 110 may be about 100 nm to about 150 nm.

The second metal layer 120 is disposed on the first metal layer. The second metal layer 120 may include molybdenum and/or titanium. A thickness of the second metal layer 120 may be about 10 nm to about 100 nm.

Figure 2:
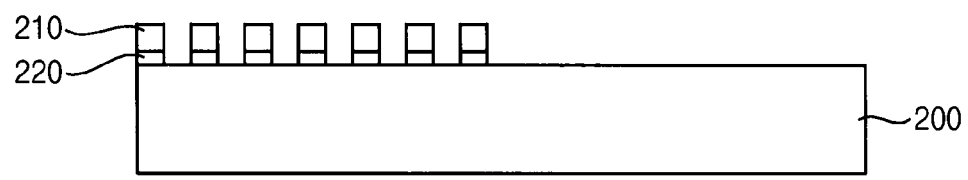
FIG. 2 is a cross-sectional view illustrating a polarizer in accordance with one or more exemplary embodiments.

FIG. 2 is a cross-sectional view illustrating a polarizer in accordance with one or more exemplary embodiments.

Referring to FIG. 2, the polarizer may include a substrate 200, a second metal layer 220 and a first metal layer 210.

The substrate 200 includes material having relatively high transmittance, thermo-stability, and chemical compatibility. For example, the substrate 200 may include, but not limited to, at least one of glass, polyethylenenaphthalate, polyethylene terephthalate, and polyacryl.

The second metal layer 220 is disposed on the substrate 200. The second metal layer 220 may include a plurality of protrusions. The adjacent protrusions are spaced apart from each other. The protrusions and the first metal layer 210 may form a linear pattern. The second metal layer 220 may include molybdenum and/or titanium. A thickness of the second metal layer 220 may be about 10 nm to about 100 nm.

The first metal layer 210 is disposed on the second metal layer 220. The first metal layer 210 may include, but not limited to, at least one of aluminum (Al), gold (Au), silver (Ag), copper (Cu), chrome (Cr), iron (Fe), and nickel (Ni). A thickness of the first metal layer 210 may be about 100 nm to about 150 nm.

FIGS. 3A, 3B, 3C, 3D, 3E, and 3F are cross-sectional views for describing a method of manufacturing the polarizer of FIG. 1, according to one or more exemplary embodiments.

Figure 3A:
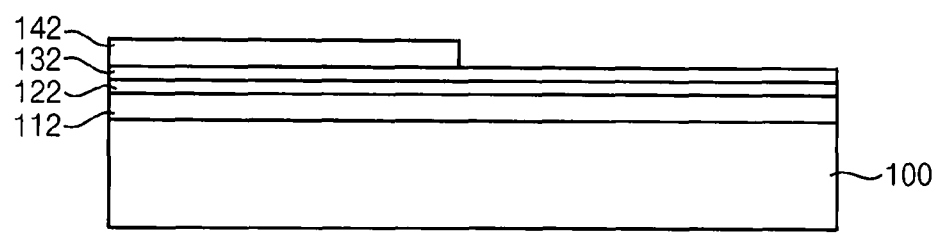
FIGS. 3A, 3B, 3C, 3D, 3E, and 3F are cross-sectional views for describing a method of manufacturing the polarizer of FIG. 1, according to one or more exemplary embodiments.

Referring to FIG. 3A, a lower metal layer 112 is formed on a substrate 100. The substrate 100 includes material having relatively high transmittance, thermo-stability, and chemical compatibility. For example, the substrate 100 may include, but not limited to, at least one of glass, polyethylenenaphthalate, polyethylene terephthalate, and polyacryl. The lower metal layer 112 may include at least one of aluminum (Al), gold (Au), silver (Ag), copper (Cu), chrome (Cr), iron (Fe), and nickel (Ni). The lower metal layer 112 may be formed by a deposition process. For example, the lower metal layer 112 may be formed by a chemical vapor deposition process, but is not limited thereto. A thickness of the lower metal layer 112 may be about 100 nm to about 150 nm.

An upper metal layer 122 is formed on the lower metal layer 112. The upper metal layer 122 may include molybdenum and/or titanium. The upper metal layer 122 may be formed by the chemical vapor deposition process, but is not limited thereto. A thickness of the upper metal layer 122 may be about 10 nm to about 100 nm.

A hard mask 132 is formed on the upper metal layer 122. The hard mask 132 may include silicon oxide (SiOx). For example, the hard mask 132 may include silicon dioxide (SiO$_2$). The hard mask 132 may be formed by the deposition process. For example, the hard mask 132 may be formed by the chemical vapor deposition process, but is not limited thereto.

An adhesion layer 142 is formed on a portion of the hard mask 132. An area where the adhesion layer 142 is formed may correspond with an area where the polarizer is formed. The adhesion layer 142 may be formed by a printing process and/or an inkjet printing process. For example, the adhesion layer 142 may include at least one of rubber-based adhesion, acryl-based adhesion, vinyl ester-based adhesion, silicon-based adhesion, and urethane-based adhesion. The adhesion layer 142 may also include pressure-sensitive adhesion such as acrylic polymer adhesion and/or vinyl ether polymer adhesion. Applying pressure to the adhesion layer 142 including the pressure-sensitive adhesion may improve the adhesive strength between the hard mask 132 disposed under the adhesion layer 142 and a polymer layer 152 to be formed on the adhesion layer 142.

Figure 3B:
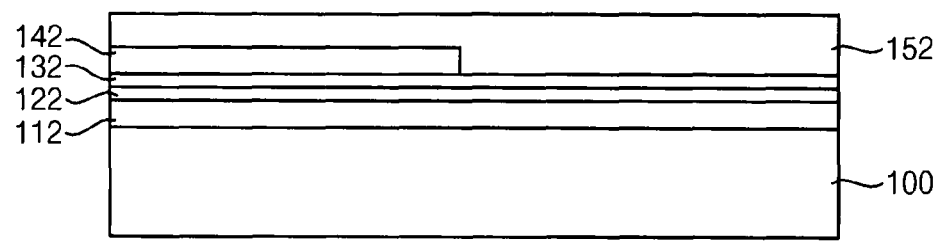

Referring to FIG. 3B, the polymer layer 152 is formed on the hard mask 132 and the adhesion layer 142. The polymer layer 152 may include thermosetting resin and/or photo curable resin, but is not limited thereto. For example, the thermosetting resin may include at least one of urea resin, melamine resin, phenol resin, etc. The photo curable resin may include, but not limited to, polymerizable compounds having a polymerizable functional group, a photopolymerization initiator initiating polymerization of the polymerizable compounds by irradiation, surfactants, antioxidants, etc.

Figure 3C:
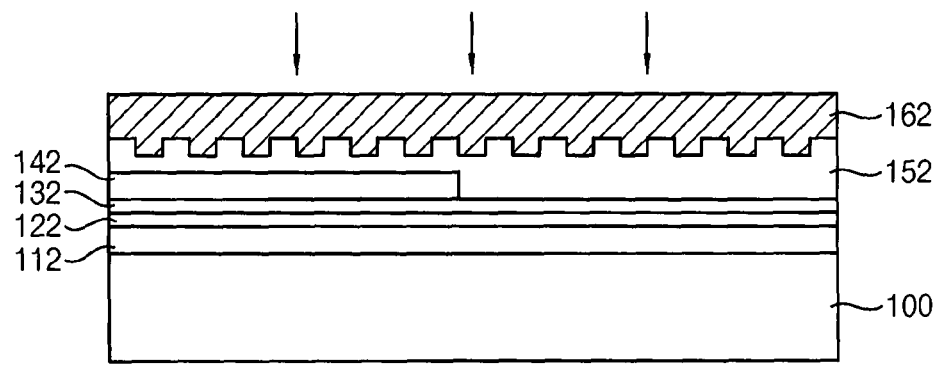

Referring to FIG. 3C, a mold 162 is contacted with the polymer layer 152, and the mold 162 is pressed toward the polymer layer 152 in a direction indicated by the downward arrows, to form a lattice pattern on the polymer layer 152. The mold 162 has a plurality of protrusions and a plurality of recesses. The polymer layer 152 may have a plurality of recesses corresponding to the protrusions of the mold 162 and may have a plurality of protrusions corresponding to the recess of the mold 162.

When the polymer layer 152 includes the thermosetting resin, the mold 162 may include material having relatively low coefficient of thermal expansion, such as metal. When the polymer layer 152 includes the photo curable resin, the mold 162 may include material having relatively high light-transmittance and strength, such as transparent macromolecule.

When the polymer layer 152 includes the thermosetting resin, the mold 162 is contacted with the polymer layer 152, and the polymer layer 152 is heated to a temperature over a glass transition temperature of the thermosetting resin. The mold 162 is pressed toward the polymer layer 152, and the pattern of the mold 162 may be imprinted in the polymer layer 152. The polymer layer 152 is cooled to a temperature under the glass transition temperature, hardening the patterned polymer layer 152.

When the polymer layer 152 includes the photo curable resin, the mold 162 makes contact with the polymer layer 152, and the mold 162 is pressed toward the polymer layer 152, so that the pattern of the mold 162 is imprinted in the polymer layer 152. The mold 162 includes the material having high light-transmittance, so a light may be radiated onto the polymer layer 152. The radiated light may harden the patterned polymer layer 152.

Figure 3D:
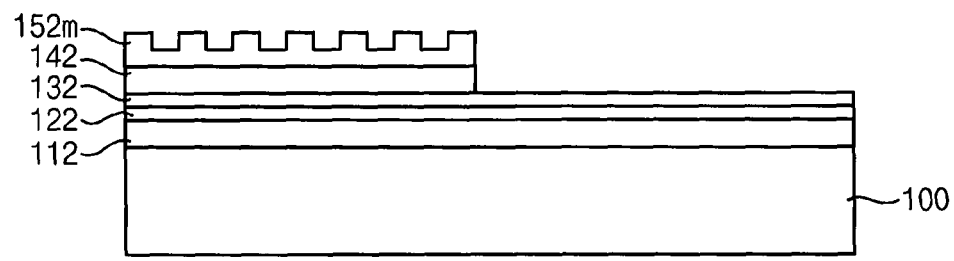

Referring to FIG. 3D, the mold 162 is removed from the hardened patterned polymer layer 152. When the mold 162 is removed, a portion of the patterned polymer layer 152 which is not disposed on the adhesion layer 142 may be removed together. A portion of the patterned polymer layer 152 disposed on the adhesion layer 142 is remained having a lattice pattern 152*m*.

Figure 3E:
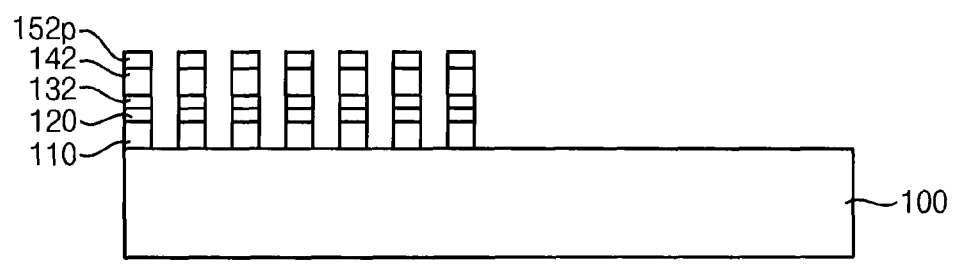

Referring to FIG. 3E, the lattice pattern 152*m*, the adhesion layer 142 and the hard mask 132 are partially removed. For example, the lattice pattern 152*m*, the adhesion layer 142, and the hard mask 132 may be dry etched. Since the lattice pattern 152*m* has the protrusions corresponding to the mold 162, the protrusions may be remained, and portions of the lattice pattern 152*m*, the adhesion layer 142 and the hard mask 132 disposed between the protrusions may be removed by the etching. Thus, the protrusions of the lattice pattern 152*m* may be remained to form a remaining lattice pattern 152*p*. The upper metal layer 122 corresponding to the portions between the protrusions of the lattice pattern 152*m* are exposed.

The upper metal layer 122 and the lower metal layer 112 are etched to form the second metal layer 120 and the first metal layer 110, respectively. An exposed portion of the upper metal layer 122 and a portion of the lower metal layer 112 corresponding to the exposed portion of the upper metal layer 122 are exposed to form the linear pattern. A size of the linear pattern may be adjusted by controlling a thickness of the lower metal layer 112, a thickness of the upper metal layer 122 and a width of the mold 162.

Figure 3F:
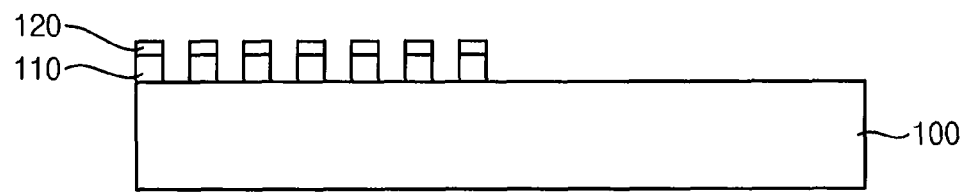

Referring to FIG. 3F, the remaining lattice pattern 152*p*, the adhesion layer 142 and the hard mask 132 may be removed together. Thus, a polarizer including a first metal layer 110 and a second metal layer 120 disposed on the first metal layer 110 may be formed. According to exemplary embodiments, the hard mask 132 may be remained.

FIGS. 4A, 4B, 4C, 4D, 4E, and 4F are cross-sectional views for describing a method of manufacturing a polarizer of FIG. 2, according to one or more exemplary embodiments.

Figure 4A:
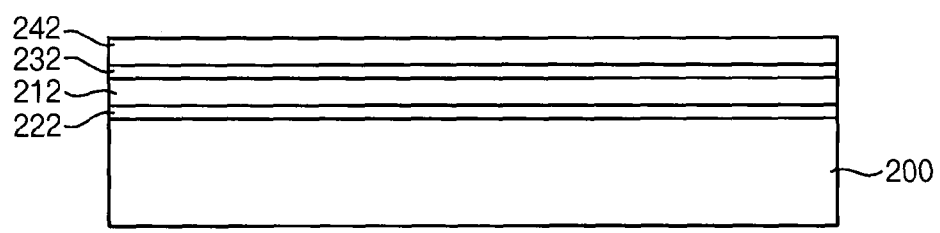
FIGS. 4A, 4B, 4C, 4D, 4E, and 4F are cross-sectional views for describing a method of manufacturing the polarizer of FIG. 2, according to one or more exemplary embodiments.

Referring to FIG. 4A, a lower metal layer 222 is formed on a substrate 200. The substrate 200 includes material which having relatively high transmittance, thermo-stability, and chemical compatibility. For example, the substrate 200 may include, but are not limited thereto, at least one of glass, polyethylenenaphthalate, polyethylene terephthalate, and polyacryl. The lower metal layer 222 may include molybdenum and/or titanium. The lower metal layer 222 may be formed by a chemical vapor deposition process, but is not limited thereto. A thickness of the lower metal layer 222 may be about 10 nm to about 100 nm.

An upper metal layer 212 is formed on the lower metal layer 222. The upper metal layer 212 may include at least one of aluminum (Al), gold (Au), silver (Ag), copper (Cu), chrome (Cr), iron (Fe), and nickel (Ni). The upper metal layer 212 is formed by the deposition process. For example, the upper metal layer 212 may be formed by the chemical vapor deposition process, but is not limited thereto. A thickness of the upper metal layer 212 may be about 100 nm to about 150 nm.

A hard mask 232 is formed on the upper metal layer 212. The hard mask 232 may include silicon oxide (SiOx). For example, the hard mask 232 may include silicon dioxide (SiO$_2$). The hard mask 232 may be formed by the deposition process. For example, the hard mask 232 may be formed by the chemical vapor deposition process, but is not limited thereto.

An adhesion layer 242 is formed on the hard mask 232. When a mold 262 is removed, the adhesion layer 242 may limit a polymer layer 252 formed on the adhesion layer 242 from being removed from the substrate 200 together with the mold 262. The adhesion layer 242 may be formed by a printing process and/or an inkjet printing process.

For example, the adhesion layer 242 may include at least one of rubber-based adhesion, acryl-based adhesion, vinyl ester-based adhesion, silicon-based adhesion and urethane-based adhesion. The adhesion layer 242 may also include pressure-sensitive adhesion such as acrylic polymer adhesion and/or vinyl ether polymer adhesion. Applying pressure to the adhesion layer 242 including the pressure-sensitive adhesion may improve the adhesive strength between the hard mask 232 disposed under the adhesion layer 242 and the polymer layer 252 to be formed on the adhesion layer 242.

Figure 4B:
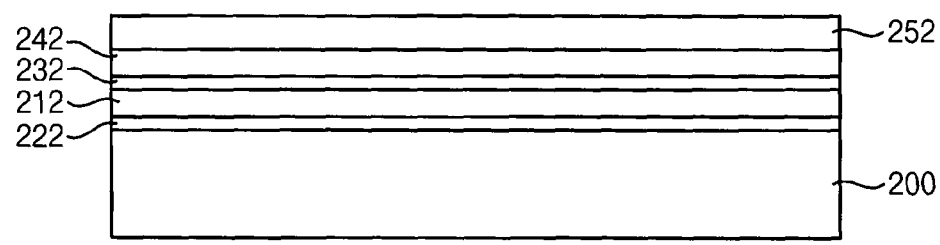

Referring to FIG. 4B, the polymer layer 252 is formed on the adhesion layer 242. The polymer layer 252 may include thermosetting resin and/or photo curable resin, but is not limited thereto. For example, the thermosetting resin may include at least one of urea resin, melamine resin, phenol resin, etc. The photo curable resin may include, but not limited to, polymerizable compounds having a polymerizable functional group, a photopolymerization initiator initiating polymerization of the polymerizable compounds by irradiation, surfactants, antioxidants, etc.

Figure 4C:
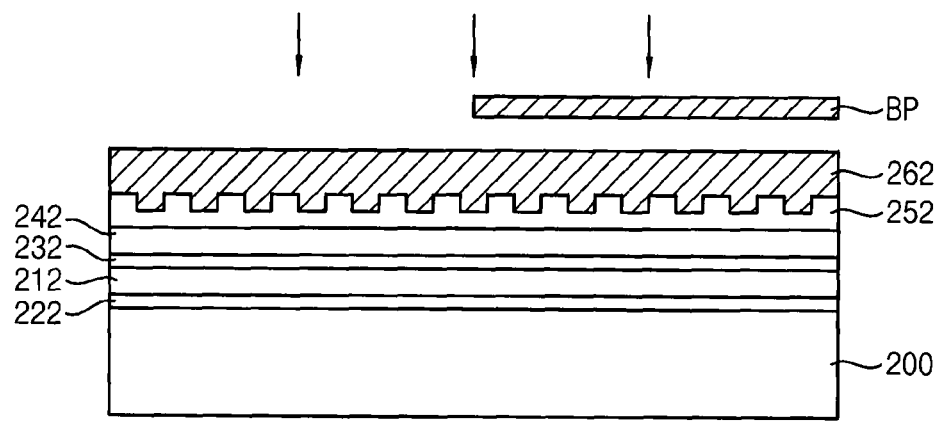

Referring to FIG. 4C, a mold 262 is contacted with the polymer layer 252, and the mold 262 is pressed toward the polymer layer 252 in a direction indicated by the downward arrows, to form a lattice pattern on the polymer layer 252. The mold 262 has a plurality of protrusions and a plurality of recesses. The polymer layer 252 may have a plurality of recesses corresponding to the protrusions of the mold 262 and may have a plurality of protrusions corresponding to the recess of the mold 262.

When the polymer layer 252 includes the thermosetting resin, the mold 262 may include material having relatively low coefficient of thermal expansion such as metal. When the polymer layer 252 includes the photo curable resin, the mold 262 may include material having relatively high light-transmittance and strength, such as transparent macromolecule.

When the polymer layer 252 includes the thermosetting resin, the mold 262 makes contact with the polymer layer 252, and the polymer layer 252 is heated to a temperature over a glass transition temperature of the thermosetting resin. The mold 262 is pressed toward the polymer layer 252, and the pattern of the mold 262 may be imprinted in the polymer layer 252. The polymer layer 252 is cooled to a temperature under the glass transition temperature, hardening the patterned polymer layer 252.

When the polymer layer 252 includes the photo curable resin, the mold 262 makes contact with the polymer layer 252, and the mold 262 is pressed toward the polymer layer 252, so that the pattern of the mold 262 is imprinted in the polymer layer 252. The mold 262 includes the material having high light-transmittance, so a light may be radiate onto the polymer layer 252. The radiated light may harden the patterned polymer layer 252.

While curing the polymer layer 252, a light blocking mask BP may be disposed on an area where the polarizer is not formed. The light blocking mask BP may limit a light energy such as heat and/or ultraviolet rays. Thus, the light blocking mask BP may limit the polymer layer 252 disposed on the area where the polarizer is not formed from being cured.

Figure 4D:
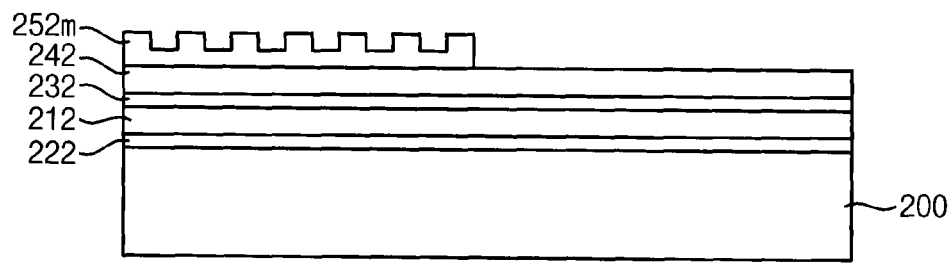

Referring to FIG. 4D, the mold 262 is removed from the cured polymer layer 252. A portion of the polymer layer 252 where the light blocking mask BP is disposed may be removed together with the mold 262. The other portion of the polymer layer 252 where the light blocking mask BP is not disposed may be remained having a lattice pattern 252m.

Figure 4E:
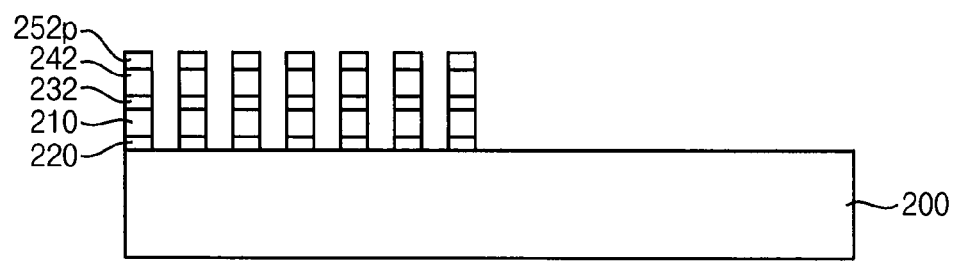

Referring to FIG. 4E, the lattice pattern 252m, the adhesion layer 242 and the hard mask 232 are partially removed. For example, the lattice pattern 252m, the adhesion layer 242, and the hard mask 232 may be dry etched. Since the lattice pattern 252m has the protrusions corresponding to the mold 262, the protrusions may be remained, and portions of the lattice pattern 252m, the adhesion layer 242 and the hard mask 232 disposed between the protrusions may be removed by the etching. Thus, a remaining lattice pattern 252p may be formed from the remaining protrusions of the lattice pattern 252m, and the upper metal layer 212 corresponding to the portions between the protrusions of the lattice pattern 252m is exposed.

The upper metal layer 212 and the lower metal layer 222 are etched to form the first metal layer 210 and the second metal layer 220, respectively. An exposed portion of the upper metal layer 212 and a portion of the lower metal layer 222 corresponding to the exposed portion of the upper metal layer 212 are exposed to form the linear pattern. A size of the linear pattern may be adjusted by controlling thicknesses of the lower metal layer 222 and a thickness of the upper metal layer 212, and a width of the mold 262.

Figure 4F:
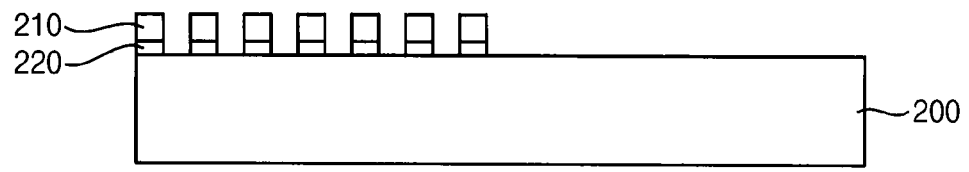

Referring to FIG. 4F, the remaining lattice pattern 252p, the adhesion layer 242 and the hard mask 232 are removed together. Thus, a polarizer including a second metal layer 220 and a first metal layer 210 disposed on the second metal layer 220 may be formed. According to exemplary embodiments, the hard mask 232 may be remained.

Figure 5:
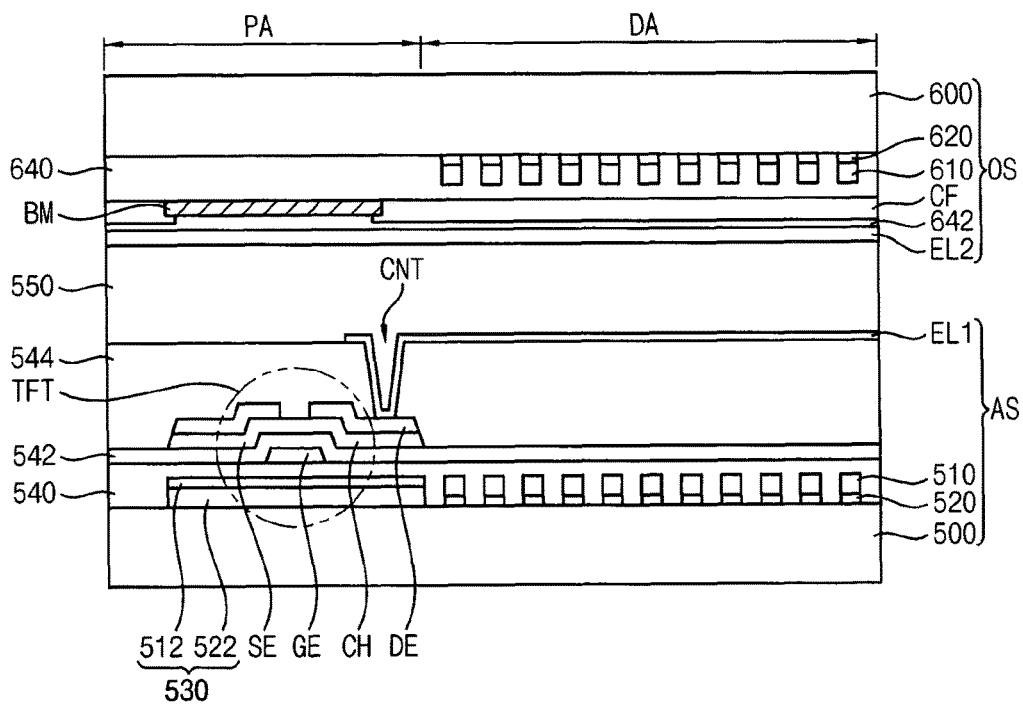
FIG. 5 is a cross-sectional view illustrating a display panel in accordance with one or more exemplary embodiments.

FIG. 5 is a cross-sectional view illustrating a display panel in accordance with one or more exemplary embodiments.

The display panel includes an array substrate AS, an opposite substrate OS, and a liquid crystal layer 550 disposed between the array substrate AS and opposite substrate OS. The display panel includes a transmittance area DA and a light blocking area PA. The transmittance area DA is configured to pass a light from a backlight unit. The light blocking area PA is configured to block the light.

The array substrate AS includes a first substrate 500, a lower linear pattern, a reflection pattern 530, a first insulating layer 540, a gate insulating layer 542, a thin film transistor TFT, a protecting layer 544 and a first electrode EL1. The lower linear pattern includes a lower first metal layer 510 and a lower second metal layer 520.

The lower second metal layer 520 is disposed on the first substrate 500. The lower first metal layer 510 is disposed on the lower second metal layer 520. The lower first metal layer 510 and the lower second metal layer 520 form a lower linear pattern. The lower first metal layer 510 and the lower second metal layer 520 are substantially the same as the first metal layer 210 and the second metal layer 220 in FIG. 2, respectively. Thus, any further detailed descriptions concerning the same elements will be omitted.

The reflection pattern 530 corresponds to the light blocking area PA, and is disposed on the first substrate 500. The reflection pattern 530 has a flat surface and partially reflects the light from the backlight unit. The reflection pattern 530 overlaps the thin film transistor TFT. The reflection pattern 530 and the lower linear pattern are disposed on a same layer. The reflection pattern 530 may include a material substantially same as the lower linear pattern. The reflection pattern 530 may include a lower second metal layer 522 and a lower first metal layer 512 disposed on the lower second metal layer 522. For example, the reflection pattern 530 may include a multi-layered metal structure.

The first insulating layer 540 is disposed on the first substrate 500, the lower linear pattern, and the reflection pattern 530. The first insulating layer 540 may include silicon oxide (SiOx), but is not limited thereto.

A gate electrode GE and a gate line (not shown) are disposed on the first insulating layer 540. The display panel may include a plurality of gate electrodes GE and gate lines. The drain electrode DE is electrically connected the first electrode EL1 through a contact hole CNT.

The gate insulating layer 542 is disposed on the first insulating layer 540, the gate electrode GE, and the gate line. The gate insulating layer 542 may include inorganic material such as silicon oxide (SiOx) and silicon nitride (SiNx), but is not limited thereto.

A channel layer CH is disposed on the gate insulating layer 542 overlapping the gate electrode GE. The channel layer CH may include a semiconductor layer including amorphous silicon (a-Si:H), and an ohmic contact layer including n+ amorphous silicon (n+ a-Si:H). The channel layer CH may also include an oxide semiconductor. The oxide semiconductor may include an amorphous oxide including at least one of indium (In), zinc (Zn), gallium (Ga), tin (Sn), and hafnium (Hf). More particularly, the oxide semiconductor may include an amorphous oxide including indium (In), zinc (Zn), and gallium (Ga), and/or an amorphous oxide including indium (In), zinc (Zn), and hafnium (Hf). The oxide semiconductor may include, but not limited to, an oxide such as indium zinc oxide ("InZnO"), indium gallium oxide ("InGaO"), indium tin oxide ("InSnO"), zinc tin oxide ("ZnSnO"), gallium tin oxide ("GaSnO"), and gallium zinc oxide ("GaZnO").

A source electrode SE and a drain electrode DE are disposed on the channel layer CH. The source electrode SE may be connected to a data line (not shown). The display panel may include a plurality of source electrodes SE, drain electrodes DE and data lines.

The gate electrode GE, the source electrode SE, the drain electrode DE and the channel layer CH form the thin film transistor TFT.

The protecting layer 544 is disposed on the thin film transistor TFT. The protecting layer 544 may include inorganic material such as silicon oxide (SiOx) and silicon nitride (SiNx). The protecting layer 544 may also include organic insulating material having relatively low permittivity. The protecting layer 544 may have a single layer structure, or a double layer structure of inorganic and organic insulating layers. The protecting layer 544 includes a contact hole CNT exposing a portion of the drain electrode DE.

The lower first metal layer 510 and the lower second metal layer 520 form the lower linear pattern. According to a plan view of the display panel, which may be seen, for example, from below the first substrate 500, the lower linear pattern may have a longitudinal axis which extends in a direction which is perpendicular to, in parallel with, or inclined with respect to the gate line, but the exemplary embodiments are not limited thereto.

The opposite substrate OS includes a second substrate 600, an upper linear pattern, a second insulating layer 640, a black matrix BM, a color filter CF, an over-coating layer 642 and a second electrode EL2. The upper linear pattern includes an upper first metal layer 610 and an upper second metal layer 620.

The second substrate 600 is disposed facing the first substrate 500.

The upper second metal layer 620 is disposed on the second substrate 600. The upper first metal layer 610 is disposed on the upper second metal layer 620. The upper first metal layer 610 and the upper second metal layer 620 form an upper linear pattern. The upper first metal layer 610 and the upper second metal layer 620 are substantially the same as the first metal layer 210 and the second metal layer 220 in FIG. 2, respectively. Thus any further detailed descriptions concerning the same elements will be omitted. The upper linear pattern is disposed in the transmittance area DA. The upper linear pattern is not disposed in the light blocking area PA.

A second insulating layer 640 is disposed on the second substrate 600, the upper first metal layer 610, and the upper second metal layer 620. The second insulating layer 640 may include silicon oxide (SiOx), but is not limited thereto.

The black matrix BM is disposed on the second insulating layer 640. The black matrix BM corresponds to the light blocking area PA, and is configured to block the light. Thus, the black matrix BM is disposed overlapping the data line, the gate line and the thin film transistor TFT.

The black matrix BM may include, for example, a dark color or black material such as inorganic black material, organic black material, etc. For example, the black material may include a coloring agent such as carbon black, an organic material or inorganic material, color pigment, and/or the like to represent black. The black matrix BM may include organic black material such as acryl resin and/or binder resin.

The color filter CF is disposed on the black matrix BM and the second insulating layer 640. The color filter CF effectively colors the light passing through the liquid crystal layer 550. The color filter CF may include a red color filter, a green color filter and a blue color filter, but is not limited thereto. The color filter CF corresponds to a pixel area. The display panel may include a plurality of color filters. Adjacent color filters may have different colors from each other, but are not limited thereto. The color filter CF may overlap an adjacent color filter CF at a boundary of the pixel area. The color filter CF may be spaced apart from the adjacent color filter CF at the boundary of the pixel area.

The over-coating layer 642 is disposed on the black matrix BM. The over-coating layer 642 provides a substantially flat surface and flattens the stepped profile of the color filter CF, protects the color filter CF, and insulates the color filter CF. The over-coating layer 642 may include acrylic-epoxy material, but is not limited thereto.

The second electrode EL2 corresponds to the pixel area. The second electrode EL2 is electrically connected to a common voltage line (not shown). The second electrode EL2 may have a slit pattern including a plurality of openings. The second electrode EL2 may include a transparent conductive material, such as indium tin oxide ("ITO"), indium zinc oxide ("IZO"), etc.

The liquid crystal layer 550 is disposed between the array substrate AS and the opposite substrate OS. The liquid crystal layer 550 includes liquid crystal molecules having optical anisotropy. The liquid crystal molecules are driven by an electric field generated by voltages applied to the first and second electrodes EL1 and EL2, so that an image is displayed by passing or blocking the light through the liquid crystal layer 550.

Figure 6:
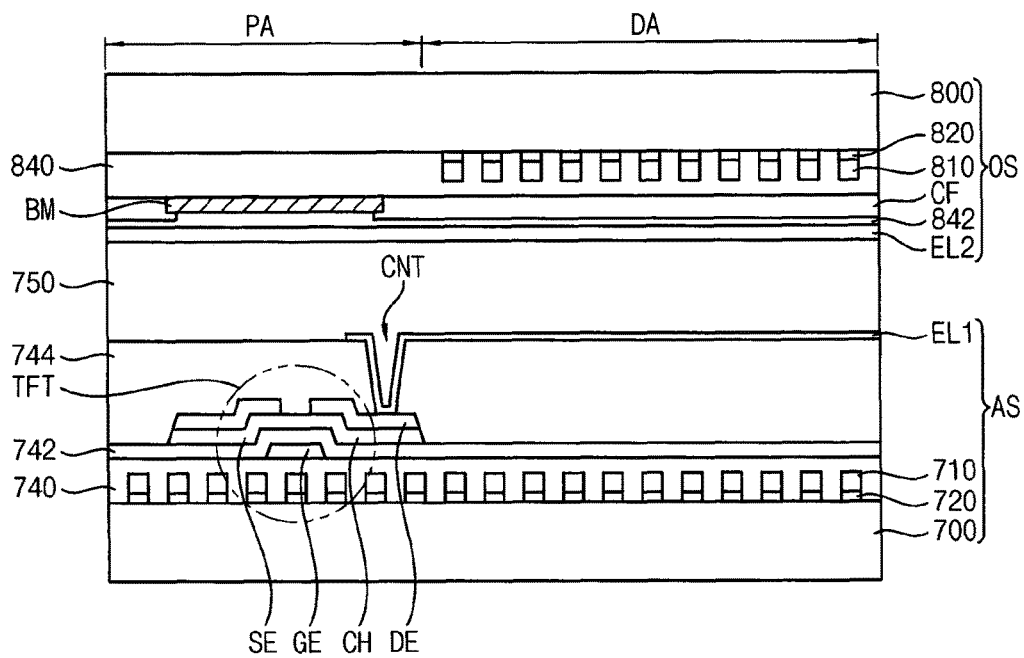
FIG. 6 is a cross-sectional view illustrating a display panel in accordance with one or more exemplary embodiments.

FIG. 6 is a cross-sectional view illustrating a display panel in accordance with one or more exemplary embodiments. Referring to FIG. 6, the display panel is substantially the same as the display panel of FIG. 5, except for the lower polarizer. Thus, any further detailed descriptions concerning the same elements will be omitted.

Referring to FIG. 6, the display panel includes a lower polarizer and an upper polarizer. The upper polarizer is substantially the same as the polarizer of FIG. 2. Thus, any further detailed descriptions concerning the same elements will be omitted.

The lower polarizer includes a substrate 700 and a lower linear pattern. The substrate 700 includes material which having relatively high transmittance, thermo-stability, and chemical compatibility. For example, the substrate 700 may include, but are not limited thereto, at least one of glass, polyethylenenaphthalate, polyethylene terephthalate, polyacryl, and a combination thereof.

The lower linear pattern includes a first metal layer 710 and a second metal layer 720. The lower second metal layer 720 may include a plurality of protrusions. The adjacent protrusions are spaced apart from each other. The lower linear pattern is formed from the protrusions of the lower second metal layer 720 and the lower first metal layer 710. The lower linear pattern is disposed in the transmittance area DA and the light blocking area PA. The reflection pattern 530 may be omitted in the array substrate AS of the display panel in FIG. 6. The lower second metal layer 720 may include molybdenum and/or titanium. A thickness of the lower second metal layer 720 may be about 10 nm to about 100 nm.

The lower first metal layer 710 is disposed on the lower second metal layer 720. The lower first metal layer 710 may include at least one of aluminum (Al), gold (Au), silver (Ag), copper (Cu), chrome (Cr), iron (Fe) and nickel (Ni). A thickness of the lower first metal layer 710 may be about 100 nm to about 150 nm.

Figure 7:
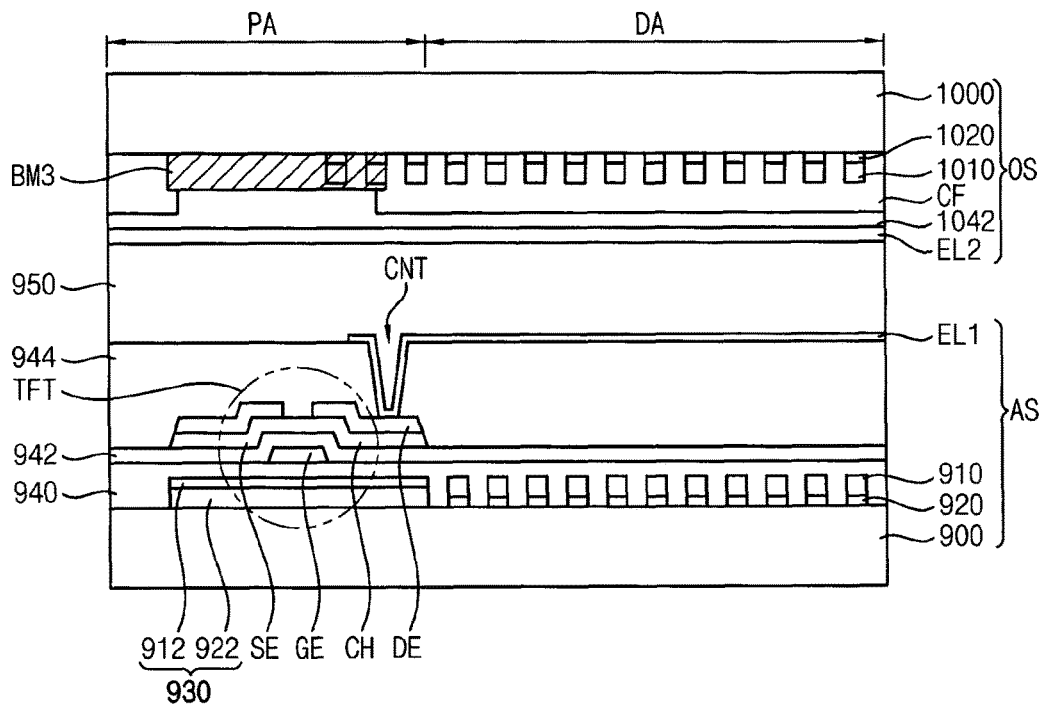
FIG. 7 is a cross-sectional view illustrating a display panel in accordance with one or more exemplary embodiments.

FIG. 7 is a cross-sectional view illustrating a display panel in accordance with one or more exemplary embodiments of the inventive concept.

Referring to FIG. 7, the display panel is substantially the same as the display panel of FIG. 5, except for the upper polarizer. Thus, any further detailed descriptions concerning the same elements will be omitted.

Referring to FIG. 7, the display panel includes a lower polarizer and an upper polarizer. The lower polarizer is substantially the same as the lower polarizer of FIG. 5. Thus, any further detailed descriptions concerning the same elements will be omitted.

The upper polarizer includes a substrate 1000 and an upper linear pattern. The substrate 1000 includes material having relatively high transmittance, thermo-stability, and chemical compatibility. For example, the substrate 1000 may include, but not limited to, at least one of glass, polyethylenenaphthalate, polyethylene terephthalate, and polyacryl.

The upper linear pattern includes a first metal layer 1010 and a second metal layer 1020. The upper linear pattern is disposed on the transmittance area DA.

The upper second metal layer 1020 is disposed on the substrate 1000. The upper second metal layer 1020 may include a plurality of protrusions. The adjacent protrusions are spaced apart from each other. The protrusions of the upper second metal layer 1020 and the upper first metal layer 1010 may form a linear pattern. The upper second metal layer 1020 may include molybdenum and/or titanium. A thickness of the upper second metal layer 1020 may be about 10 nm to about 100 nm.

The upper first metal layer 1010 is disposed on the upper second metal layer 1020. The upper first metal layer 1010 may include at least one of aluminum (Al), gold (Au), silver (Ag), copper (Cu), chrome (Cr), iron (Fe), and nickel (Ni). A thickness of the upper first metal layer 1010 may be about 100 nm to about 150 nm.

A black matrix BM3 corresponds to the light blocking area PA, and is disposed on the substrate 1000. The black matrix BM3 overlaps a portion of the upper linear pattern including the upper first metal layer 1010 and the upper second metal layer 1020. Thus, the black matrix BM3 blocks a provided light between the upper linear pattern and the black matrix BM3. The black matrix BM3 and the upper linear pattern may be disposed on a same layer.

The black matrix BM3 may include, for example, a dark color and/or black material, such as inorganic black material, organic black material, etc. For example, the black material may include a coloring agent such as carbon black, an organic material and/or inorganic material, color pigment, and/or the like, to represent black. The black matrix BM3 may include organic black material such as acryl resin or binder resin.

Figure 8:
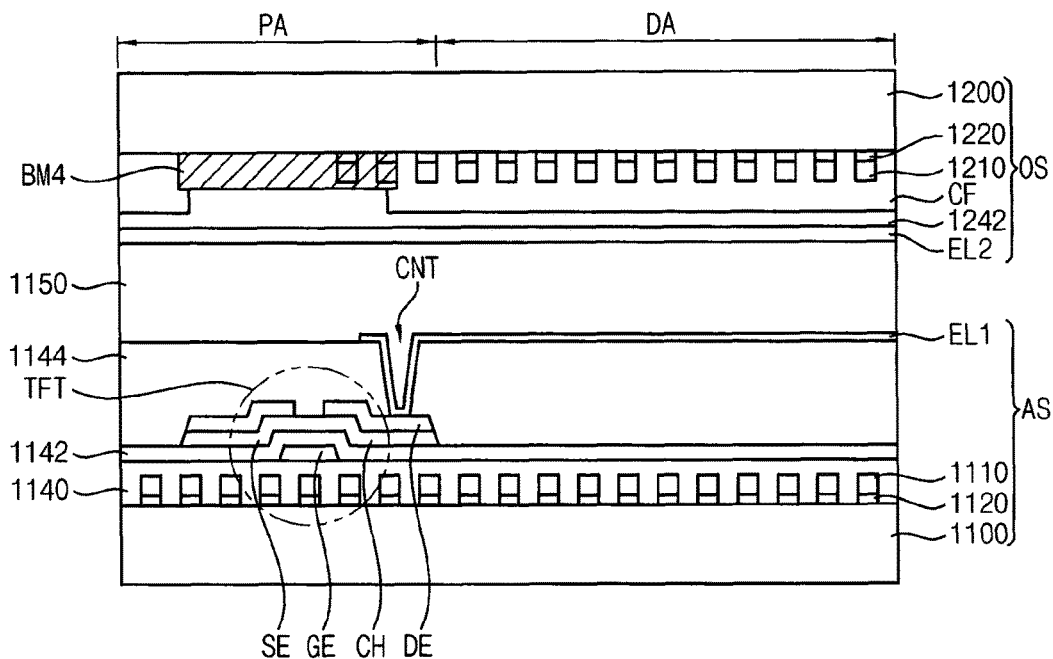
FIG. 8 is a cross-sectional view illustrating a display panel in accordance with one or more exemplary embodiments.

FIG. 8 is a cross-sectional view illustrating a display panel in accordance with one or more exemplary embodiments.

Referring to FIG. 8, the display panel is substantially the same as the display panel of FIG. 5, except for the lower polarizer and the upper polarizer. Thus, any further detailed descriptions concerning the same elements will be omitted.

Referring to FIG. 8, the display panel includes a lower polarizer and an upper polarizer. The lower polarizer a substrate 1100 and a lower linear pattern. The substrate 1100 includes material having relatively high transmittance, thermo-stability, and chemical compatibility. For example, the substrate 1100 may include, but are not limited thereto, at least one of glass, polyethylenenaphthalate, polyethylene terephthalate, and polyacryl.

The lower linear pattern includes a first metal layer 1110 and a second metal layer 1120. The lower linear pattern is disposed in the transmittance area DA and the light blocking area PA.

The lower second metal layer 1120 is disposed on the substrate 1100. The lower second metal layer 1120 may include a plurality of protrusions. The adjacent protrusions are spaced apart from each other. The protrusions of the lower second metal layer 1120 and the lower first metal layer 1110 may form a linear pattern. The lower second metal layer 1120 may include molybdenum and/or titanium. A thickness of the lower second metal layer 1120 may be about 10 nm to about 100 nm.

The lower first metal layer 1110 is disposed on the lower second metal layer 1120. The lower first metal layer 1110 may include at least one of aluminum (Al), gold (Au), silver (Ag), copper (Cu), chrome (Cr), iron (Fe), and nickel (Ni). A thickness of the lower first metal layer 1110 may be about 100 nm to about 150 nm.

The upper polarizer includes a substrate 1200 and an upper linear pattern. The substrate 1200 includes material having relatively high transmittance, thermo-stability, and chemical compatibility. For example, the substrate 1200 may include, but not limited to, at least one of glass, polyethylenenaphthalate, polyethylene terephthalate, and polyacryl.

The upper linear pattern includes a first metal layer 1210 and a second metal layer 1220. The upper linear pattern is disposed on the transmittance area DA.

The upper second metal layer 1220 is disposed on the substrate 1200. The upper second metal layer 1220 may include a plurality of protrusions. The adjacent protrusions are spaced apart from each other. The protrusions of the upper second metal layer 1220 and the upper first metal layer 1210 may form a linear pattern. The upper second metal layer 1220 may include molybdenum and/or titanium. A thickness of the upper second metal layer 1220 may be about 10 nm to about 100 nm.

The upper first metal layer 1210 is disposed on the upper second metal layer 1220. The upper first metal layer 1210 may include at least one of aluminum (Al), gold (Au), silver (Ag), copper (Cu), chrome (Cr), iron (Fe), and nickel (Ni). A thickness of the upper first metal layer 1210 may be about 100 nm to about 150 nm.

A black matrix BM4 corresponds to the light blocking area PA, and is disposed on the substrate 1200. The black matrix BM4 overlaps a portion of the upper linear pattern including the upper first metal layer 1210 and the upper second metal layer 1220. Thus, the black matrix BM4 blocks a provided light between the upper linear pattern and the black matrix BM4. The black matrix BM4 and the upper linear pattern may be disposed on a same layer.

The black matrix BM4 may include, for example, a dark color and/or black material such as inorganic black material, organic black material, etc. For example, the black material may include a coloring agent such as carbon black, an organic material and/or inorganic material, color pigment, and/or the like to represent black. The black matrix BM4 may include organic black material such as acryl resin or binder resin.

Figure 9:
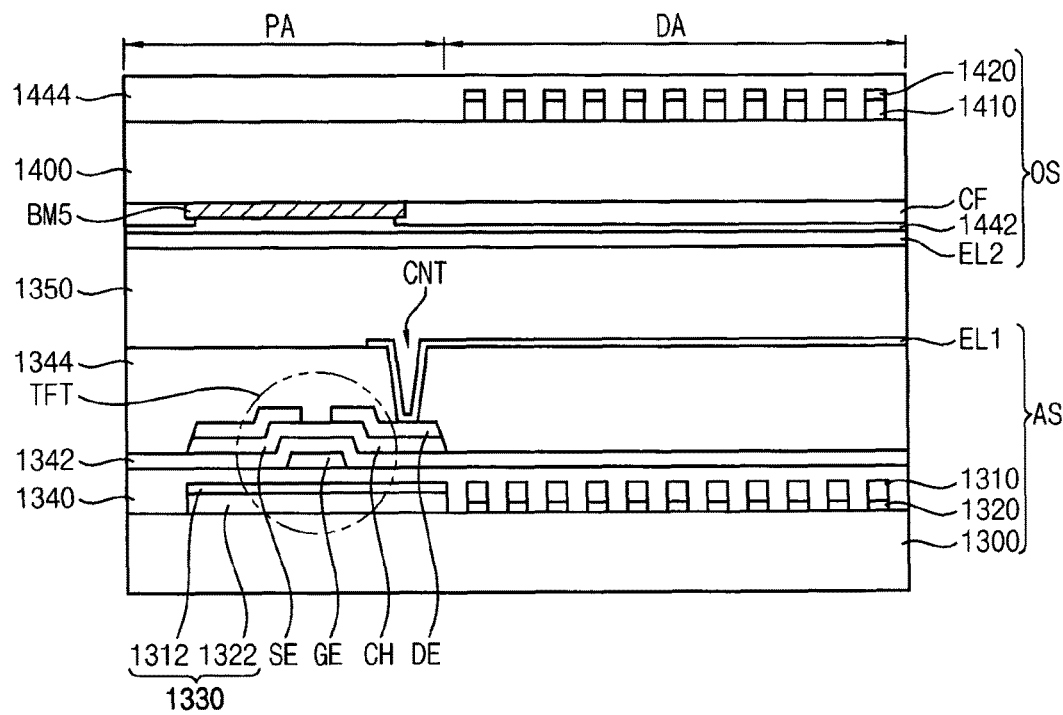
FIG. 9 is a cross-sectional view illustrating a display panel in accordance with one or more exemplary embodiments.

FIG. 9 is a cross-sectional view illustrating a display panel in accordance with one or more exemplary embodiments.

Referring to FIG. 9, the display panel is substantially the same as the display panel of FIG. 5, except for the upper polarizer. Thus, any further detailed descriptions concerning the same elements will be omitted.

Referring to FIG. 9, the display panel includes a lower polarizer and an upper polarizer. The lower polarizer is substantially the same as the lower polarizer of FIG. 2. Thus, any further detailed descriptions concerning the same elements will be omitted.

The upper polarizer includes a substrate 1400, an upper linear pattern and an upper protecting layer 1444. The upper linear pattern includes a first metal layer 1410 and a second metal layer 1420.

The substrate 1400 includes material having relatively high transmittance, thermo-stability, and chemical compatibility. For example, the substrate 1400 may include, but not limited to, at least one of glass, polyethylenenaphthalate, polyethylene terephthalate, and polyacryl.

The upper linear pattern includes the upper first metal layer 1410 and the second metal layer 1420. The upper linear pattern is disposed on the transmittance area DA.

The upper first metal layer 1410 is disposed on the substrate 1400. The second metal layer 1420 is disposed on the upper first metal layer 1410. The upper protecting layer 1444 covers the upper linear pattern including the upper first metal layer 1410 and the second metal layer 1420 to protect the upper linear pattern.

The upper first metal layer 1410 may include a plurality of protrusions. The adjacent protrusions are spaced apart from each other. The protrusions of the upper first metal layer 1410 and the second metal layer 1420 may form a linear pattern. The upper first metal layer 1410 may include at least one of aluminum (Al), gold (Au), silver (Ag), copper (Cu), chrome (Cr), iron (Fe), and nickel (Ni). A thickness of the upper first metal layer 1410 may be about 100 nm to about 150 nm.

The second metal layer 1420 may include molybdenum and/or titanium. A thickness of the second metal layer 1420 may be about 10 nm to about 100 nm.

A black matrix BM5 corresponds to the light blocking area PA, and is disposed on a surface opposite to the surface of the substrate 1400 on which the upper linear pattern is formed.

The black matrix BM5 may include, for example, a dark color and/or black material, such as inorganic black material, organic black material, etc. For example, the black material may include a coloring agent such as carbon black, an organic material and/or inorganic material, color pigment, and/or the like to represent black. The black matrix BM5 may include organic black material such as acryl resin or binder resin.

Figure 10:
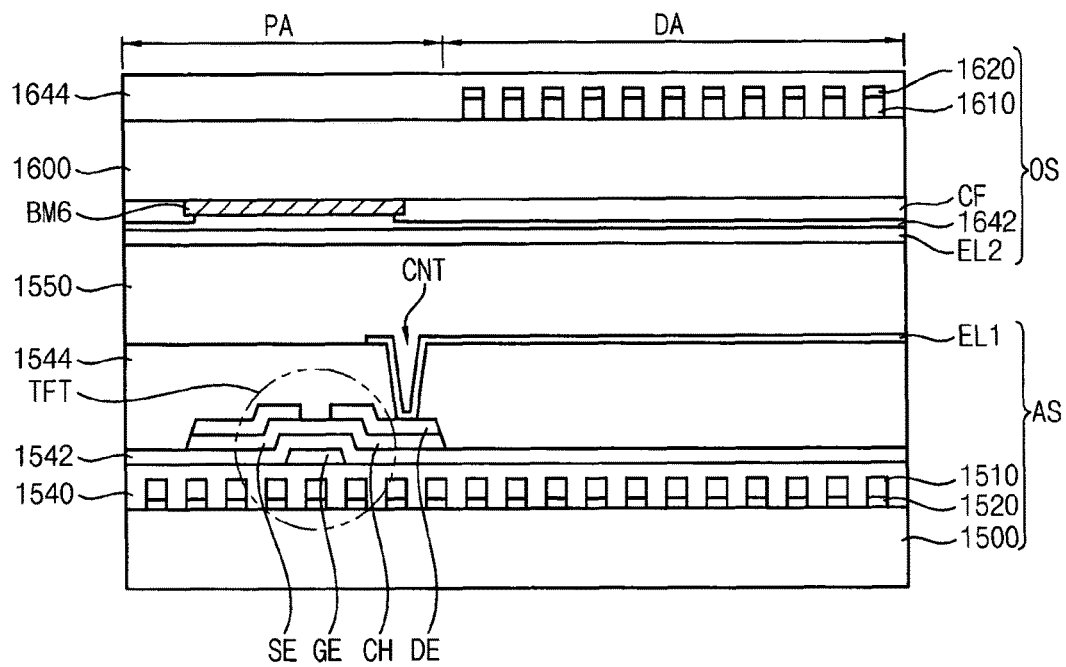
FIG. 10 is a cross-sectional view illustrating a display panel in accordance with one or more exemplary embodiments.

FIG. 10 is a cross-sectional view illustrating a display panel in accordance with one or more exemplary embodiments.

Referring to FIG. 10, the display panel is substantially the same as the display panel of FIG. 5, except for the lower polarizer and the upper polarizer. Thus, any further detailed descriptions concerning the same elements will be omitted.

The lower polarizer includes a substrate 1500 and a lower linear pattern. The substrate 1500 includes material having relatively high transmittance, thermo-stability, and chemical compatibility. For example, the substrate 1500 may include, but not limited to, at least one of glass, polyethylenenaphthalate, polyethylene terephthalate, and polyacryl.

The lower linear pattern includes a first metal layer 1510 and a second metal layer 1520. The lower linear pattern is disposed on the transmittance area DA and the light blocking area PA.

The second metal layer 1520 is disposed on the substrate 1500. The second metal layer 1520 may include a plurality of protrusions. The adjacent protrusions are spaced apart from each other. The protrusions of the second metal layer 1520 and the lower first metal layer 1510 may form a linear pattern. The second metal layer 1520 may include molybdenum and/or titanium. A thickness of the second metal layer 1520 may be about 10 nm to about 100 nm.

The lower first metal layer 1510 is disposed on the second metal layer 1520. The lower first metal layer 1510 may include at least one of aluminum (Al), gold (Au), silver (Ag), copper (Cu), chrome (Cr), iron (Fe), and nickel (Ni). A thickness of the lower first metal layer 1510 may be about 100 nm to about 150 nm.

The upper polarizer includes a substrate 1600, an upper linear pattern and an upper protecting layer 1644. The upper linear pattern includes a first metal layer 1610 and a second metal layer 1620. The substrate 1600 includes material having relatively high transmittance, thermo-stability, and chemical compatibility. For example, the substrate 1600 may include, but not limited to, at least one of glass, polyethylenenaphthalate, polyethylene terephthalate, and polyacryl.

The upper linear pattern includes the upper first metal layer 1610 and the second metal layer 1620. The upper linear pattern is disposed on the transmittance area DA.

The upper first metal layer 1610 is disposed on the substrate 1600. The second metal layer 1620 is disposed on an upper surface of the upper first metal layer 1610. The upper protecting layer 1644 covers the upper linear pattern including the upper first metal layer 1610 and the second metal layer 1620 to protect the upper linear pattern.

The upper first metal layer 1610 may include a plurality of protrusions. The adjacent protrusions are spaced apart from each other. The protrusions of the upper first metal layer 1610 and the second metal layer 1620 may form a linear pattern. The upper first metal layer 1610 may include at least one of aluminum (Al), gold (Au), silver (Ag), copper (Cu), chrome (Cr), iron (Fe), and nickel (Ni). A thickness of the upper first metal layer 1610 may be about 100 nm to about 150 nm.

The second metal layer 1620 may include molybdenum and/or titanium. A thickness of the second metal layer 1620 may be about 10 nm to about 100 nm.

A black matrix BM6 corresponds to the light blocking area PA, and is disposed on a surface opposite to the surface of the substrate 1600 on which the upper linear pattern is formed.

The black matrix BM6 may include, for example, a dark color and/or black material such as inorganic black material, organic black material, etc. For example, the black material may include a coloring agent such as carbon black, an organic material and/or inorganic material, color pigment, and/or the like to represent black. The black matrix BM6 may include organic black material such as acryl resin or binder resin.

Figure 11:
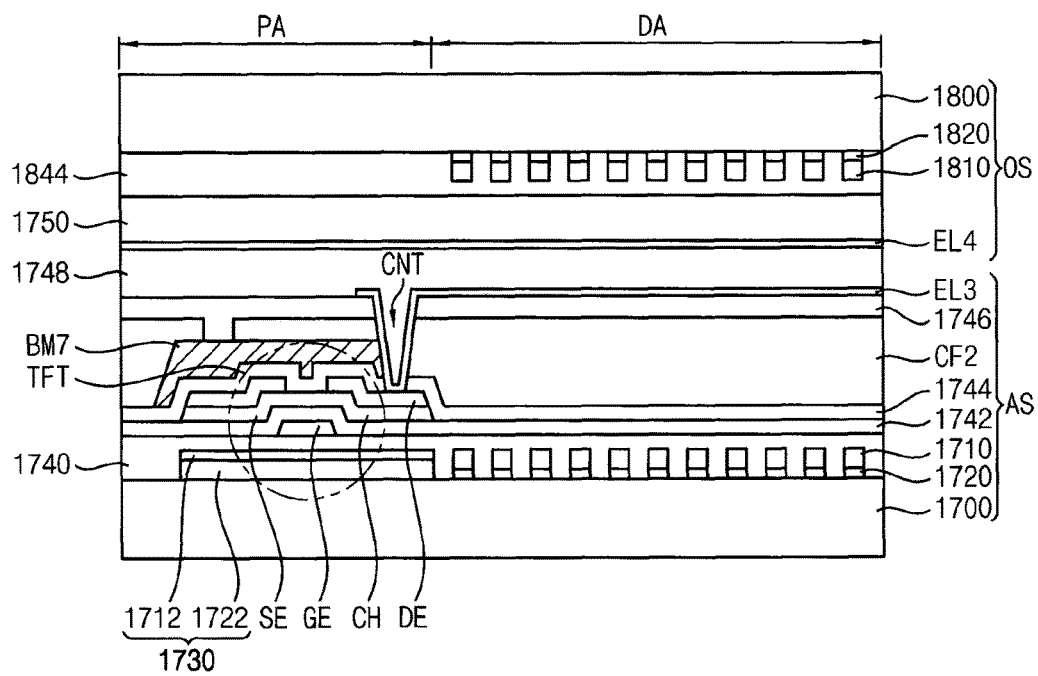
FIG. 11 is a cross-sectional view illustrating a display panel in accordance with one or more exemplary embodiments.

FIG. 11 is a cross-sectional view illustrating a display panel in accordance with one or more exemplary embodiments.

Referring to FIG. 11, the display panel includes an array substrate, an opposite substrate OS, and a liquid crystal layer 1750 disposed between the array substrate AS and opposite substrate OS. The display panel includes a transmittance area DA and a light blocking area PA. The transmittance area DA is configured to pass the light from the backlight unit. The light blocking area PA is configured to block the light.

The array substrate AS includes a first substrate 1700, a lower linear pattern, a reflection layer 1730, a first insulating layer 1740, a gate insulating layer 1742, a thin film transistor TFT, a protecting layer 1744, a black matrix BM7, a color filter CF2, a over-coating layer 1746, a first electrode EL3, a protecting layer 1748, and a second electrode EL4. The lower linear pattern includes a lower first metal layer 1710 and a lower second metal layer 1720.

The lower second metal layer 1720 is disposed on the first substrate 1700. The lower first metal layer 1710 is disposed on the lower second metal layer 1720. The lower first metal layer 1710 and the lower second metal layer 1720 form the lower linear pattern. The lower linear pattern corresponds to the transmittance area DA, is disposed on the substrate 1700. According to a plan view of the display panel, which may be seen, for example, from below the first substrate 1700, the lower linear pattern may have a longitudinal axis which extends in a direction which is perpendicular to, in parallel with or inclined with respect to the gate line, but the exemplary embodiments are not limited thereto.

The reflection pattern 1730 corresponds to the light blocking area PA, and is disposed on the first substrate 1700. The reflection pattern 1730 has a flat surface and partially reflects the light from the backlight unit. The reflection pattern 1730 overlaps the thin film transistor TFT. The reflection pattern 1730 and the lower linear pattern are disposed on a same layer. The reflection pattern 1730 may include a material substantially same as the lower linear pattern. The reflection pattern 1730 may include a lower second metal layer 1722 and a lower first metal layer 1712 disposed on the lower second metal layer 1722. For example, the reflection pattern 1730 may include a multi-layered metal structure.

The first insulating layer 1740 is disposed on the first substrate 1700, the lower linear pattern, and the reflection pattern 1730. The first insulating layer 1740 may include silicon oxide (SiOx), but is not limited thereto.

A gate electrode GE and a gate line (not shown) are disposed on the first insulating layer 1740. The display panel may include a plurality of gate electrodes GE and gate lines.

The gate insulating layer 1742 is disposed on the first insulating layer 1740, the gate electrode GE, and the gate line. The gate insulating layer 1742 may include inorganic material such as silicon oxide (SiOx) and silicon nitride (SiNx), but is not limited thereto.

A channel layer CH is disposed on the gate insulating layer 1742 overlapping the gate electrode GE. The channel layer CH may include a semiconductor layer including amorphous silicon (a-Si:H), and an ohmic contact layer including n+ amorphous silicon (n+a-Si:H). The channel layer CH may also include an oxide semiconductor. The oxide semiconductor may include an amorphous oxide including at least one of indium (In), zinc (Zn), gallium (Ga), tin (Sn), and hafnium (Hf). More particularly, the oxide semiconductor may include an amorphous oxide including indium (In), zinc (Zn) and gallium (Ga), and/or an amorphous oxide including indium (In), zinc (Zn) and hafnium (Hf). The oxide semiconductor may include, but not limited to, an oxide such as indium zinc oxide ("InZnO"), indium gallium oxide ("InGaO"), indium tin oxide ("InSnO"), zinc tin oxide ("ZnSnO"), gallium tin oxide ("GaSnO"), and gallium zinc oxide ("GaZnO").

A source electrode SE and a drain electrode DE are disposed on the channel layer CH. The source electrode SE may be connected to a data line (not shown). The display panel may include a plurality of source electrodes SE, drain electrodes DE and data lines. The drain electrode DE is electrically connected to the first electrode EL3 through a contact hole CNT.

The gate electrode GE, the source electrode SE, the drain electrode DE and the channel layer CH form the thin film transistor TFT.

The protecting layer 1744 is disposed on the thin film transistor TFT. The protecting layer 1744 may include inorganic material such as silicon oxide (SiOx) and silicon nitride (SiNx). The protecting layer 1744 may also include organic insulating material having relatively low permittivity. The protecting layer 1744 may have a single layer structure, or a double layer structure of inorganic and organic insulating layers. The protecting layer 1744 includes the contact hole CNT exposing a portion of the drain electrode DE.

The black matrix BM7 corresponds with the light blocking area PA, and is disposed on the protecting layer 1744. The black matrix BM7 overlaps the reflection layer 1730 including the lower first metal layer 1712 and the lower second metal layer 1722.

The black matrix BM7 may include, for example, a dark color or black material such as inorganic black material, organic black material, etc. For example, the black material may include a coloring agent such as carbon black, an organic material or inorganic material, color pigment, and/or the like to represent black. The black matrix BM7 may include organic black material such as acryl resin and/or binder resin.

The color filter CF2 is disposed on the black matrix BM7 and the protecting layer 1744. The color filter CF2 effectively colors the light passing through the liquid crystal layer 1750. The color filter CF2 may include a red color filter, a green color filter and a blue color filter, but is not limited thereto. The color filter CF2 corresponds to a pixel area. The display panel may include a plurality of color filters. Adjacent color filters may have different colors from each other, but are not limited thereto. The color filter CF2 may overlap an adjacent color filter CF2 in a boundary of the pixel area. The color filter CF2 may be spaced apart from the adjacent color filter CF at the boundary of the pixel area.

The over-coating layer 1746 is disposed on the color filter CF2 and the black matrix BM7 not covered by the color filter CF2. The over-coating layer 1746 provides a substantially flat surface and flattens the stepped profile of the color filter CF2, protects the color filter CF2, and insulates the color filter CF2. The over-coating layer 1746 may include acrylic-epoxy material, but is not limited thereto.

The first electrode EL3 is disposed on the over-coating layer 1746. The first electrode EL3 may have a slit pattern including a plurality of openings. The first electrode EL3 may include a transparent conductive material, such as indium tin oxide ("ITO"), indium zinc oxide ("IZO"), etc.

The protecting layer 1748 is disposed on the first electrode EL3. The protecting layer 1748 may include inorganic material such as silicon oxide (SiOx) and silicon nitride (SiNx). The protecting layer 1748 may also include organic insulating material having relatively low permittivity. The protecting layer 1748 may have a single layer structure, or a double layer structure of inorganic and organic insulating layers.

The second electrode EL4 is disposed on the protecting layer 1748. The second electrode EL4 corresponds to the pixel area. The second electrode EL4 is electrically connected to a common voltage line (not shown). The second electrode EL4 may have a slit pattern including a plurality of openings. The second electrode EL4 may include a transparent conductive material, such as indium tin oxide ("ITO"), indium zinc oxide ("IZO"), etc.

Thus, the first substrate has a color filter-on-Array (COA) structure on which a color filter is formed on an array substrate AS, and a black matrix-on-array (BOA) structure on which a black matrix is formed on an array substrate AS.

The opposite substrate OS includes a second substrate 1800, an upper linear pattern and a second insulating layer 1844. The upper linear pattern includes an upper first metal layer 1810 and an upper second metal layer 1820.

The second substrate 1800 is disposed facing the first substrate 1700.

The upper second metal layer 1820 is disposed on the second substrate 1800. The upper first metal layer 1810 is disposed on the upper second metal layer 1820. The upper first metal layer 1810 and the upper second metal layer 1820 form an upper linear pattern. The upper first metal layer 1810 and the upper second metal layer 1820 are substantially the same as the upper first metal layer 610 and the second metal layer 620 in FIG. 5, respectively. Thus any further detailed descriptions concerning the same elements will be omitted.

The upper linear pattern is disposed in the transmittance area DA. The upper linear pattern is not disposed in the light blocking area PA.

A second insulating layer 1840 is disposed on the second substrate 1800, the upper first metal layer 1810, and the upper second metal layer 1820. The second insulating layer 1840 may include silicon oxide (SiOx), but is not limited thereto.

The liquid crystal layer 1750 is disposed between the array substrate AS and the opposite substrate OS. The liquid crystal layer 1750 includes liquid crystal molecules having optical anisotropy. The liquid crystal molecules are driven by an electric field generated by voltages applied to the first and second electrodes EL3 and EL4, so that an image is displayed by passing or blocking the light through the liquid crystal layer 1750.

Figure 12:
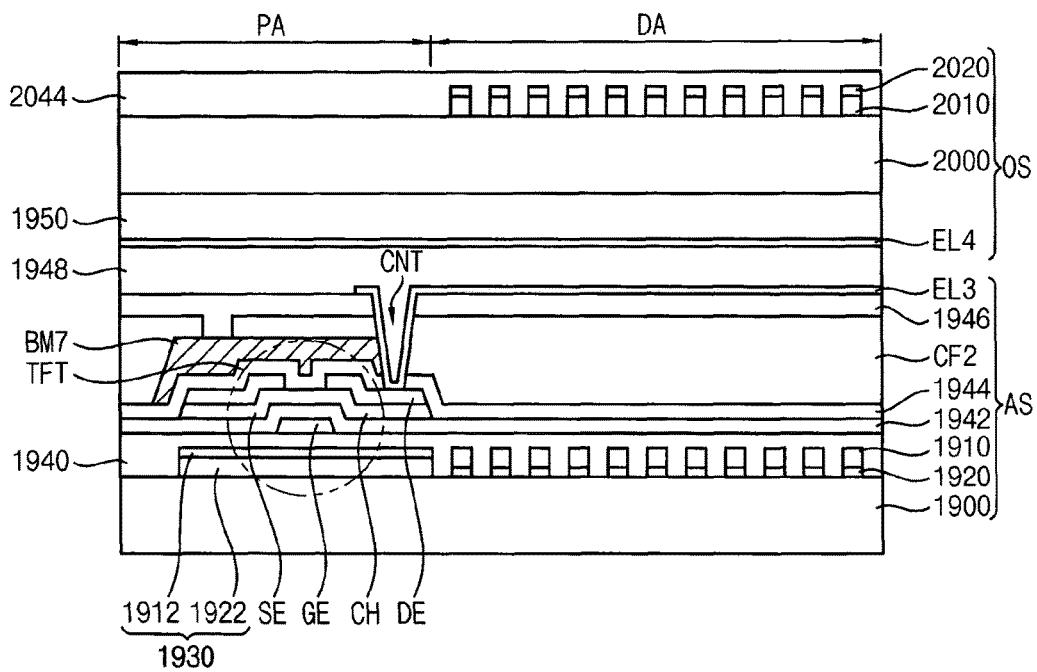
FIG. 12 is a cross-sectional view illustrating a display panel in accordance with one or more exemplary embodiments.

FIG. 12 is a cross-sectional view illustrating a display panel in accordance with one or more exemplary embodiments.

Referring to FIG. 12, the display panel is substantially the same as the display panel of FIG. 11, except for the upper polarizer. Thus, any further detailed descriptions concerning the same elements will be omitted.

The upper polarizer includes a substrate 2000, an upper linear pattern, and an upper protecting layer 2044. The upper linear pattern includes a first metal layer 2010 and a second metal layer 2020.

The substrate 2000 includes material having relatively high transmittance, thermo-stability, and chemical compatibility. For example, the substrate 2000 may include, but not limited to, at least one of glass, polyethylenenaphthalate, polyethylene terephthalate, and polyacryl.

The upper linear pattern includes the upper first metal layer 2010 and the upper second metal layer 2020. The upper linear pattern is disposed on the transmittance area DA.

The upper first metal layer 2010 is disposed on the substrate 2000. The upper second metal layer 2020 is disposed on the upper first metal layer 2010. The upper protecting layer 2044 covers the upper linear pattern including the upper first metal layer 2010 and the upper second metal layer 2020 to protect the upper linear pattern.

The upper first metal layer 2010 may include a plurality of protrusions. The adjacent protrusions are spaced apart from each other. The protrusions of the upper first metal layer 2010 and the upper second metal layer 2020 may form a linear pattern. The upper first metal layer 2010 may include at least one of aluminum (Al), gold (Au), silver (Ag), copper (Cu), chrome (Cr), iron (Fe), and nickel (Ni). A thickness of the upper first metal layer 2010 may be about 100 nm to about 150 nm.

The upper second metal layer 2020 may include molybdenum and/or titanium. A thickness of the upper second metal layer 2020 may be about 10 nm to about 100 nm.

According to the exemplary embodiments, a reflectivity of the display panel may be decreased by including a black matrix including an organic material.

According to the exemplary embodiments, a thickness of a display panel may be decreased by forming the black matrix and a polarizer on a same layer.

According to the exemplary embodiments, the polarizer including a plurality of linear patterns and a reflection pattern disposed on the same layer together by nano imprint, the manufacturing cost of providing a reflection pattern may be decreased.

According to the exemplary embodiments, a reflection pattern of the polarizer may include flat surface to partially reflect a light.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display panel comprising:
    a first substrate;
    a second substrate facing the first substrate, the second substrate comprising a thin film transistor; and
    a liquid crystal layer disposed between the first substrate and the second substrate,
    wherein the first substrate comprises:
        a first polarizer comprising a first metal pattern spaced apart from a second metal pattern, the first and second metal patterns being disposed in a light transmittance area of the display panel and not being disposed outside the light transmittance area;
        a black matrix disposed outside the light transmittance area; and
        a first insulating layer disposed directly on the first polarizer,
    wherein the light transmittance area of the display panel is configured to pass a light from a backlight unit,
    wherein the second substrate comprises:
        a second polarizer comprising a third metal pattern spaced apart from a fourth metal pattern, the third and fourth metal patterns being disposed on the second substrate in the light transmittance area and not being disposed outside the light transmittance area; and
        a reflection pattern disposed outside the light transmittance area, the reflection pattern having a plate shape overlapping the thin film transistor, and
    wherein the reflection pattern and the second polarizer are disposed on a same layer.

2. The display panel of claim 1, wherein the black matrix comprises a black coloring agent and an organic material.

3. The display panel of claim 1, wherein:
    a first surface of the first substrate faces the second substrate;
    the first polarizer is disposed on a second surface of the first substrate, the second surface opposing the first surface of the first substrate.

4. The display panel of claim 1, wherein the first and second metal patterns comprise:
    a first metal layer comprising at least one of molybdenum and titanium; and
    a second metal layer disposed on the first metal layer, the second metal layer comprising at least one of aluminum (Al), gold (Au), silver (Ag), copper (Cu), chrome (Cr), iron (Fe), and nickel (Ni).

5. The display panel of claim 1, wherein:
    the black matrix is disposed on the first insulating layer.

6. The display panel of claim 1, wherein the second polarizer and the reflection pattern comprise:
    a first metal layer comprising at least one of aluminum (Al), gold (Au), silver (Ag), copper (Cu), chrome (Cr), iron (Fe), and nickel (Ni); and
    a second metal layer comprising at least one of molybdenum and titanium.

7. The display panel of claim 1, wherein the second substrate further comprises:
    a second insulation layer covering the second polarizer and the reflection pattern.

* * * * *